June 1, 1943.　　　　　E. V. SCHAAL　　　　　2,320,660
WIPER ARM FOR WINDSHIELD CLEANERS
Filed March 15, 1941
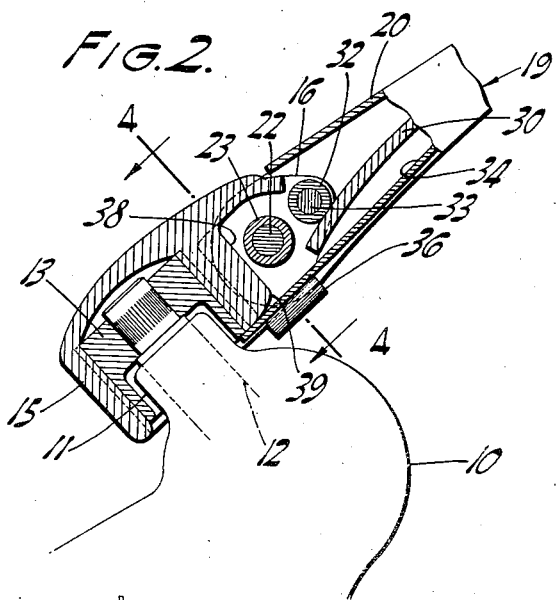
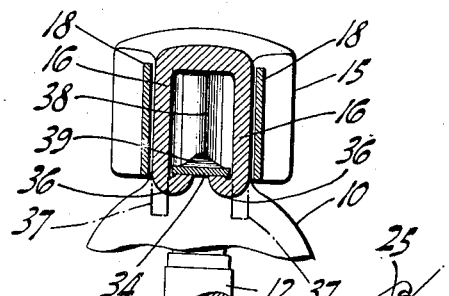
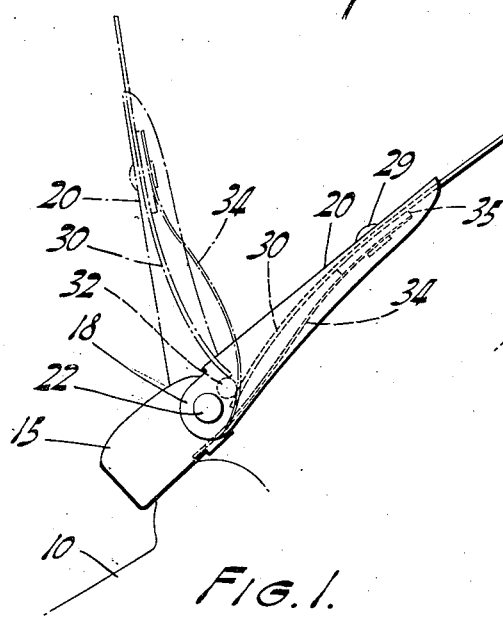
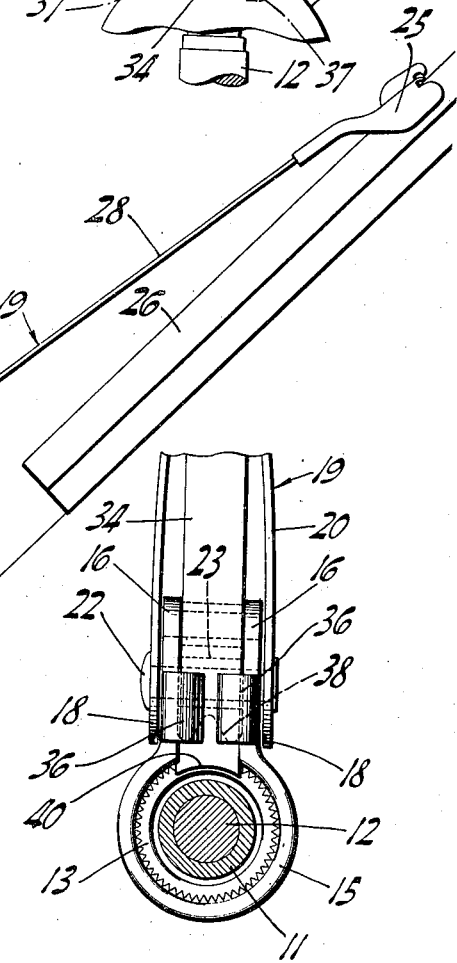
INVENTOR
Earl V. Schaal
BY
Bean, Brooks, Buckley & Bean
ATTORNEYS Patented June 1, 1943

2,320,660

UNITED STATES PATENT OFFICE 2,320,660

WIPER ARM FOR WINDSHIELD CLEANERS

Earl V. Schaal, East Aurora, N. Y., assignor to Trico Products Corporation, Buffalo, N. Y.

Application March 15, 1941, Serial No. 383,594

13 Claims. (Cl. 15—255)

This invention relates to windshield cleaners and more particularly to the mode of associating a wiper arm with its operating shaft.

According to the present invention means are provided which permit ready and facile securement of a windshield wiper arm to an oscillatable shaft in any desired angular relation with respect thereto. In the form of the invention illustrated the wiper arm is assembled with its operating shaft with the wiper arm moved so as to be spaced from the windshield and the subsequent movement of the wiper arm to operating position against the windshield is arranged to automatically complete locked assembly of the arm with the operating shaft.

In a preferred form of the invention the wiper arm is provided with a pivotally connected shaft engaging portion and resilient means are provided for normally urging the wiper pivotally with respect to the shaft engaging portion in a direction which will be toward the windshield when the parts are in finally assembled position. According to the exemplary form illustrated the resilient means may be arranged in such manner as to include an over-center arrangement whereby the resilient means will yieldingly retain the wiper arm in either of its extremes of pivotal movement with respect to the shaft engaging means.

The present invention comprehends the provision of latch means operable automatically, upon pivotal movement between the shaft engaging portion of the wiper arm and its principal body portion, for movement to and from latching position with respect to a rotatable wiper operating shaft.

In the drawing:

Fig. 1 is a fragmentary elevational view of a wiper arm and blade constructed in accordance with the teachings of my invention and shown in operating position with the associated vehicle windshield indicated schematically;

Fig. 2 is an enlarged cross sectional view of the wiper arm and drive shaft connection of the device viewed in the same direction as in Fig. 1;

Fig. 3 is an elevational view showing the inside of the drive shaft end of the wiper arm with the drive shaft and its bearing shown in cross section; and Fig. 4 is a fragmentary cross sectional view taken on the line 4—4 of Fig. 2.

In the drawing like characters of reference denote like parts throughout the several figures and the numeral 10 designates a conventional windshield wiper supporting bracket having a bearing portion 11 in which a windshield wiper actuating shaft 12 is rotatably journaled. In a preferred form an end of the drive shaft 12 protrudes from the bearing 11 and has rigidly fixed thereto an enlargement 13 which may have its outer periphery serrated or splined for removable driving association with a wiper arm hub which in the illustrated instance is designated 15.

The mode of association of the annular enlargement 13 with the end of the drive shaft 12 is immaterial to the present invention but one form of rigid connection may be achieved by serrating or otherwise deforming the end of the drive shaft as illustrated in Fig. 2 and forcing the enlargement 13 thereover.

The hub 15 for the wiper arm has formed thereon a pair of trunnions 16 for pivotally engaging a pair of spaced parallel ears 18 formed at the inner end of a wiper arm proper, designated generally 19. In the form illustrated the inner end of the wiper arm proper is of channel cross section to serve as a concealing cover for other parts of the wiper arm and is designated 20.

The trunnions 16 of the hub 15 and the ears 18 of the inner end 20 of the wiper arm are pivotally connected by means of a pivot pin 22 which is provided, between the pairs of trunnions and ears, with a spacing collar 23. The spacing collar 23 serves to reinforce the trunnions 16 of the hub 15 laterally.

The wiper arm 19 has, at the end opposite the driving shaft connection, a conventional wiper blade engaging element 25 for engaging and supporting a conventional wiper blade 26. For connecting the inner end portion 20 of the wiper arm with the blade engaging clip 25 there is preferably provided a flat resilient strip 28 which may be rigidly secured to the wiper blade engaging clip in any convenient manner, and which is preferably secured at its other end to the inner face of the web of the channel which forms the inner end 20 of the wiper arm. Such securement may be by means of a rivet as indicated at 29 in Fig. 1.

The resilient strip 28 serves, between the inner end 20 of the wiper arm and the blade engaging clip 25, to resiliently transmit to the wiper blade 26, tension which is imparted thereto by another portion of the spring strip 28 which will now be described. Beyond the rivet connection 29 in a direction toward the drive shaft 12 the spring strip 28 is extended as at 30 and, with the wiper blade in operating position, the terminal portion of such extension bears against an anti-friction roller 32 carried by a pin 33 whose ends are supported in the trunnions 16 of the hub 15.

In assembling the device sufficient initial tension is provided for the extension 30 of the spring member 28 to cause a substantial resilient pressure against the anti-friction roller 32 by the extension 30 so that the reaction to such force urges the wiper arm in a clockwise direction around its pivot 22 as viewed in Fig. 1. In this manner the wiper blade 26 is resiliently urged against the windshield glass of a vehicle with the desired amount of pressure.

A second resilient strip is provided for retaining the hub and arm assembly in driving engagement with respect to the enlargement 13 which is secured to the drive shaft 12. Such strip is designated 34 and may be conveniently secured at one end to the inside of the web of the channel 20 by means of the rivet 29 which anchors the spring strip 28 of the wiper arm. In the form illustrated a spacing block 35 is provided between the strip 34 and the spring strip 28. The opposite end of the strip 34 constitutes latch means for locking or securing the wiper arm to the drive shaft. In the illustrated form the latch means is movably carried by the shaft engaging portion of the wiper arm as by means of a pair of projections 36 which are preferably formed integrally with the extensions of the hub 15 which form the trunnions 16. Such guiding projections appear best in Figs. 3 and 4 and are preferably formed by curling or return-bending extensions which are previously formed on the trunnions 16 of the hub 15 in the initial die-casting operation. In this way the presence of fillets which may interfere with free guiding action of the projections 36 is avoided. The preliminarily formed extensions of the trunnions are shown in dot-and-dash lines in Fig. 4 and are designated 37.

The inner radial face of the hub element 15 cooperates with the projections 36 to complete the guiding of the free end of the strip 34 and such guiding action is supplemented by the provision of a V-shaped extension 38 which may be formed integrally with the hub element 15 and projects therefrom toward the wiper arm. The guiding surface of the projection 38 is rounded as shown at 39 in Figs. 2 and 4 to provide easy entry of the strip 34 therebetween.

The strip 34 is of such length that when the wiper arm 19 is in normal operating position the end of the strip 34 which is remote from its anchorage at 29 extends toward the drive shaft a distance sufficient to permit its engagement behind the enlargement 13, whereby removal of the assembly including the hub 15 and the wiper arm 19 from the enlargement 13 which is fixed rigidly to the drive shaft 12, is effectively prevented.

While in the preferred form disclosed herein the latch means is an integral part of the supporting strip 34 therefor, it will appear to those skilled in the art that the latch portion proper may be a separate element guided in the shaft engaging means. In such event a link would be provided between the latch element proper and the wiper arm proper, whereby pivotal movement of the latter with respect to the shaft engaging means would move the latch element to and from latching position. In so modifying the illustrated construction the necessity for flexibility of the latch element proper and its connecting link is dispensed with, so long as the latch means and its link are pivotally connected and provided adequate provision for urging the wiper arm against a windshield glass is made, as by means of the spring portion 30 of the resilient strip 28.

When removal of the wiping arm from association with the drive shaft is desired, the arm is rotated in a counterclockwise direction as viewed in Fig. 1 to the dot-and-dash line position there shown, whereupon the terminal portion of the extension 30 of the spring strip 28 passes over a dead center position with respect to a line connecting the centers of the pivot pin 22 and the pin 33 carrying the anti-friction roller 32. This action causes the wiper arm and associated parts to become resiliently locked in the position shown in dot-and-dash lines in Fig. 2.

It will be noted that this movement displaces the terminal portion of the strip 34 from its latching position behind the enlargement 13 and thereby permits removal of the hub and arm assembly. This unlatching is attributable partly to the fact that the guiding projections 36 for the end of the strip 34 are spaced substantially laterally of the axis of the pivot pin 22, but the removing movement of the terminal portion of the strip 34 is supplemented by engagement of the strip 34 with the anti-friction roller 32, as appears clearly from the dot-and-dash showing of Fig. 2.

To insure adequate bearing of the terminal portion of the strip 34 in its latching engagement behind the enlargement 13, such terminal portion is made convexly arcuate as at 40 in Fig. 3.

When it is desired to assemble a hub and arm unit on the enlargement 13 of the drive shaft 12, the arm is placed in the relative position indicated in dot-and-dash lines in Fig. 2 where it is resiliently held by the over-center action of the end of the extension 30 of the spring strip 28 in a manner which has been described. After the hub 15 has been placed in proper position with respect to the enlargement 13, the arm is moved toward the windshield against the light resistance of the terminal portion of the extension 30 of the spring strip 28 until such terminal portion again passes over the dead center position referred to hereinbefore, whereupon the extension 30 acts against the anti-friction roller 32 in such manner as to move the arm to operating position and place it under the desired initial tension.

It will be noted that the resilient nature of the latch strip 34 results in a substantial supplementing of the spring action of the portion 30 of the spring strip 28. By fashioning the strip 34 of a size to present sufficient resilient resistance and by properly proportioning its initial tension with the wiper arm in operating position, the latch strip 34 may entirely replace the portion 30 of the spring strip 28 in its function of urging the wiping strip against the windshield glass.

Other mechanical modifications will occur to those skilled in the art and the foregoing detailed specification and the accompanying drawing are exemplary only. My invention is not to be considered as limited otherwise than as defined in the appended claims.

I claim:

1. A windshield wiper arm having an annular shaft engaging member formed to interlock with a drive shaft for joint rotative movement, said wiper arm and said annular member being pivotally connected for relative pivotal movement in a plane substantially perpendicular to a windshield, resilient means normally urging said wiper arm toward the windshield, and latch means engageable with the drive shaft to restrain axial movement of said annular member with respect thereto and thereby effect assembly of said annular member with respect to such shaft, said latch means comprising an elongate flexible member secured at one end to said wiper arm with its other end eccentric with respect to said pivotal connection to provide a latch portion, whereby pivotal movement of said wiper arm toward and away from a windshield moves said latch portion to and from locking position with respect to said annular member and the shaft.

2. A windshield wiper arm having drive shaft engaging means at an end thereof, said wiper arm and said shaft engaging means being pivotally connected for relative pivotal movement in a plane substantially perpendicular to a windshield, resilient means normally urging said wiper arm in a direction toward the windshield, means comprising an elongate flexible member disposed toward the windshield from the axis of said pivotal connection, one end of said member being fixed wtih respect to said wiper arm and the opposite end thereof comprising latch means engageable with said drive shaft and movable toward and away from latching engagement upon pivotal movement of said wiper arm toward and away from the windshield respectively.

3. A windshield wiper arm having drive shaft engaging means at an end thereof, said wiper arm and said shaft engaging means being pivotally connected for relative pivotal movement in a plane substantially perpendicular to a windshield, resilient means normally urging said wiper arm in a direction toward the windshield, and latch means engageable with a drive shaft for securement of said shaft engaging means to the drive shaft and comprising an elongate flexible member secured at one end to said wiper arm, the other end of said latch means being adapted to be moved to and from latching engagement with said drive shaft by pivotal movement of said wiper arm toward and away from said windshield respectively.

4. A windshield wiper arm having drive shaft engaging means at an end thereof, said wiper arm and said shaft engaging means being pivotally connected for relative pivotal movement in a plane substantially perpendicular to a windshield, resilient means normally urging said wiper arm in a direction toward the windshield, latch means engageable with a drive shaft for securement of said shaft engaging means to the drive shaft and comprising an elongate flexible member secured at one end to said wiper arm, and guide means on said shaft engaging means for guiding the unsecured end of said flexible member for endwise movement, said unsecured end of the flexible member being adapted to be moved to and from latching engagement with said drive shaft by pivotal movement of said wiper arm toward and away from said windshield respectively.

5. A windshield wiper arm having drive shaft engaging means at an end thereof, said wiper arm and said shaft engaging means being pivotally connected for relative pivotal movement in a plane substantially perpendicular to a windshield, and latch means comprising an elongate flexible member secured at one end to said wiper arm and at its other end engaging guiding portions of said shaft engaging means so arranged that pivotal movement of said wipe arm toward and away from said windshield moves the guided end of said member respectively to and from latching engagement with respect to said drive shaft.

6. A windshield wiper arm having drive shaft engaging means at an end thereof, said wiper arm and said shaft engaging means being pivotally connected for relative pivotal movement in a plane substantially perpendicular to a windshield, and latch means comprising an elongate flexible member secured at one end to said wiper arm and at its other end engaging guiding portions of said shaft engaging means, so arranged that pivotal movement of said wiper arm toward and away from said windshield moves the guided end of said element respectively to and from latching engagement with respect to said drive shaft, said flexible member being provided with sufficient initial tension to urge said wiper arm in a direction pivotally toward the windshield.

7. A windshield wiper arm having drive shaft engaging means at an end thereof, said wiper arm and said shaft engaging means being pivotally connected for relative pivotal movement in a plane substantially perpendicular to a windshield, latch means and means on said shaft engaging means for supporting and guiding said latch means for movement to and from latching engagement with a drive shaft, and means engaging between said latch means and said wiper arm whereby pivotal movement of the latter toward and away from the windshield moves said latch means to and from latching position respectively.

8. A windshield wiper arm having drive shaft engaging means at an end thereof, said wiper arm and said shaft engaging means being pivotally connected for relative pivotal movement in a plane substantially perpendicular to a windshield, latch means and means on said shaft engaging means for supporting and guiding said latch means for movement to and from latching engagement with a drive shaft, and resilient means operatively connecting said latch means to said wiper arm whereby pivotal movement of the latter toward and away from the windshield moves said latch means to and from latching position respectively, said resilient means also normally urging said wiper arm pivotally toward the windshield.

9. A windshield wiper arm having drive shaft engaging means at an end thereof, said wiper arm and said shaft engaging means being pivotally connected for relative pivotal movement in a plane substantially perpendicular to a windshield, a resilient arm secured at one end to said wiper arm and having its other end engageable with said shaft engaging means to normally resiliently urge said wiper arm toward a windshield, and latch means comprising an elongate flexible member secured at one end to said wiper arm and at its other end engaging guiding portions of said shaft engaging means, said guiding portions being so arranged that pivotal movement of said wiper arm toward and away from said windshield moves the guided end of said member respectively to and from latching engagement with respect to said drive shaft.

10. A windshield wiper arm having drive shaft engaging means at an end thereof, said wiper arm and said shaft engaging means being pivotally connected for relative pivotal movement in a plane substantially perpendicular to a windshield, latch means comprising an elongate flexible member secured at one end to said wiper arm and at its other end engaging guiding portions of said shaft engaging means, said guiding portions being so arranged that pivotal movement of said wiper arm toward and away from said windshield moves the guided end of said member respectively to and from latching engagement with respect to said drive shaft, and resilient means engaging between said wiper arm and said shaft engaging means to bias the wiper arm toward either of its extreme positions of pivotal movement with respect to said shaft engaging means whereby to hold the guided end of said member either in or out of its latching engagement.

11. A wiper arm comprising a shaft engaging section, a wiper actuating section pivoted thereon, a latch carried by the first section and movable relative thereto for engaging a part on the shaft to secure the arm thereon, and means operatively connecting the latch to the actuating section and operable by and during pivotal movement of the latter to its operative position for pushing the latch to its part engaging position, said means resisting movement of the actuating section to its operative position upon failure of the latch to move to its part engaging position whereby to indicate such failure of securement by holding the actuating section out of its operative position.

12. A windshield wiper arm having a drive shaft engaging means at an end thereof, said wiper arm and said shaft engaging means being pivotally connected for relative pivotal movement to and from an operative position, shaft engaging latch means movably mounted on said shaft engaging means, and means operatively connecting the latch means to the wiper arm and so arranged that pivotal movement of said wiper arm away from its operative position moves the latch means on the shaft engaging means to an inoperative position whereby the shaft engaging means may be disengaged from a drive shaft.

13. A windshield wiper arm having drive shaft engaging means at an end thereof, said wiper arm and said shaft engaging means being pivotally connected for relative pivotal movement, latch means carried by said shaft engaging means and operatively connected to the wiper arm whereby pivotal movement of said wiper arm toward and away from said windshield disposes the latch means respectively in and out of latching engagement with the drive shaft, and resilient means secured at one end to said wiper arm and having its other end acting on said shaft engaging means to bias the wiper arm toward either of its extreme positions of pivotal movement with respect to said shaft engaging means whereby to hold the latch means either in or out of its latching engagement.

EARL V. SCHAAL.